United States Patent
Tee et al.

(10) Patent No.: US 9,450,773 B2
(45) Date of Patent: Sep. 20, 2016

(54) MULTICAST RESOURCE OPTIMIZATION

(75) Inventors: Lai King (Anna) Tee, Edison, NJ (US);
Sergio Aguirre, Southlake, TX (US);
Christopher M. Schmidt, Branchburg, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 208 days.

(21) Appl. No.: 13/334,271

(22) Filed: Dec. 22, 2011

(65) Prior Publication Data

US 2013/0163444 A1 Jun. 27, 2013

(51) Int. Cl.
| | |
|---|---|
| *H04L 5/14* | (2006.01) |
| *H04B 7/00* | (2006.01) |
| *H04L 12/28* | (2006.01) |
| *H04J 3/16* | (2006.01) |
| *H04L 12/18* | (2006.01) |
| *H04W 4/06* | (2009.01) |
| *H04W 72/00* | (2009.01) |
| *H04L 1/18* | (2006.01) |
| *H04L 29/14* | (2006.01) |
| *H04W 52/24* | (2009.01) |
| *H04W 28/18* | (2009.01) |
| *H04W 76/00* | (2009.01) |
| *H04L 1/00* | (2006.01) |
| *H04W 52/28* | (2009.01) |

(52) U.S. Cl.
CPC ......... *H04L 12/1868* (2013.01); *H04L 1/1867* (2013.01); *H04L 69/40* (2013.01); *H04W 4/06* (2013.01); *H04W 52/247* (2013.01); *H04W 72/005* (2013.01); *H04L 12/189* (2013.01); *H04L 2001/0093* (2013.01); *H04W 28/18* (2013.01); *H04W 52/287* (2013.01); *H04W 76/002* (2013.01)

(58) Field of Classification Search
CPC .... H04L 24/00; H04L 43/50; H04L 43/0852
USPC ........................................................ 370/252
See application file for complete search history.

(56) References Cited

U.S. PATENT DOCUMENTS

| | | | | |
|---|---|---|---|---|
| 2008/0045228 A1* | 2/2008 | Zhang | ................... | H04L 1/0015 455/450 |
| 2009/0207771 A1* | 8/2009 | Lindskog | ............ | H04L 12/1868 370/312 |
| 2009/0279480 A1* | 11/2009 | Rosenqvist | ........... | H04L 1/1887 370/328 |
| 2010/0009685 A1* | 1/2010 | Rysgaard | ...................... | 455/446 |
| 2010/0177717 A1* | 7/2010 | Sung | .................... | H04W 72/042 370/329 |
| 2010/0272004 A1* | 10/2010 | Maeda | .................. | H04L 5/0007 370/312 |
| 2010/0296427 A1* | 11/2010 | Lohr | ..................... | H04L 1/1845 370/312 |
| 2011/0205951 A1* | 8/2011 | Lee | ......................... | H04W 4/18 370/312 |
| 2012/0011567 A1* | 1/2012 | Cronk | ................... | H04L 63/102 726/4 |
| 2013/0230010 A1* | 9/2013 | Kim | .................... | H04W 52/146 370/329 |

(Continued)

*Primary Examiner* — Faruk Hamza
*Assistant Examiner* — Abu-Sayeed Haque (57) ABSTRACT

Content may be transmitted to mobile devices, in a network, using a Multimedia Broadcast Multicast Services (MBMS) multicast technique over wireless interfaces in the network. In one implementation, network elements in the network may receive feedback about the MBMS multicast transmission, where the feedback relates to a quality of the content, as received by the one or more mobile devices, or to the quality of the radio channel. The devices may determine whether to modify transmission parameters relating to the MBMS multicast transmission and may determine whether to retransmit lost data, corresponding to the content, to the mobile devices. The lost data may be retransmitted as a unicast transmission or a multicast transmission.

19 Claims, 7 Drawing Sheets

(56) References Cited

U.S. PATENT DOCUMENTS

2014/0020031 A1* 1/2014 Barrett ............... H04W 72/005 725/62

2014/0226552 A1* 8/2014 Niu ........................ H04W 4/06 370/312

2014/0355493 A1* 12/2014 Niu ....................... H04L 12/189 370/280

* cited by examiner

MULTICAST RESOURCE OPTIMIZATION

BACKGROUND

The increasing popularity of smart phones and other advanced wireless/mobile devices have enabled many applications to be wirelessly delivered. For example, social, video, music, and photo applications are commonly enjoyed by subscribers to wireless networks. These applications, however, can be relatively traffic intensive. The amount of traffic generated can potentially exhaust network resources, particularly the radio access network, which may act as a bottleneck for the subscribers' network connections.

DETAILED DESCRIPTION OF PREFERRED EMBODIMENTS

The following detailed description refers to the accompanying drawings. The same reference numbers in different drawings may identify the same or similar elements.

Techniques described herein may relate to the delivery of traffic over wireless networks. The traffic may be delivered as multicast traffic over the radio access portion of the network. The multicast traffic may be delivered using the Multimedia Broadcast Multicast Services (MBMS) specification, which is a point-to-multipoint interface specification for networks, such as cellular networks. The delivery of the MBMS traffic may be optimized based on feedback from the mobile devices to which the traffic is delivered. In one implementation, the feedback may be used to optimize MBMS session configuration information. Alternatively or additionally, the feedback may be used to optimize the retransmission of MBMS packets that were lost during transmission.

The term packet, as used herein, should be broadly interpreted to cover Internet Protocol (IP) packets as well as lower level data structures such as layer 2 packet data units, transport blocks, frames, subframes, or other data structures.

Figure 1:
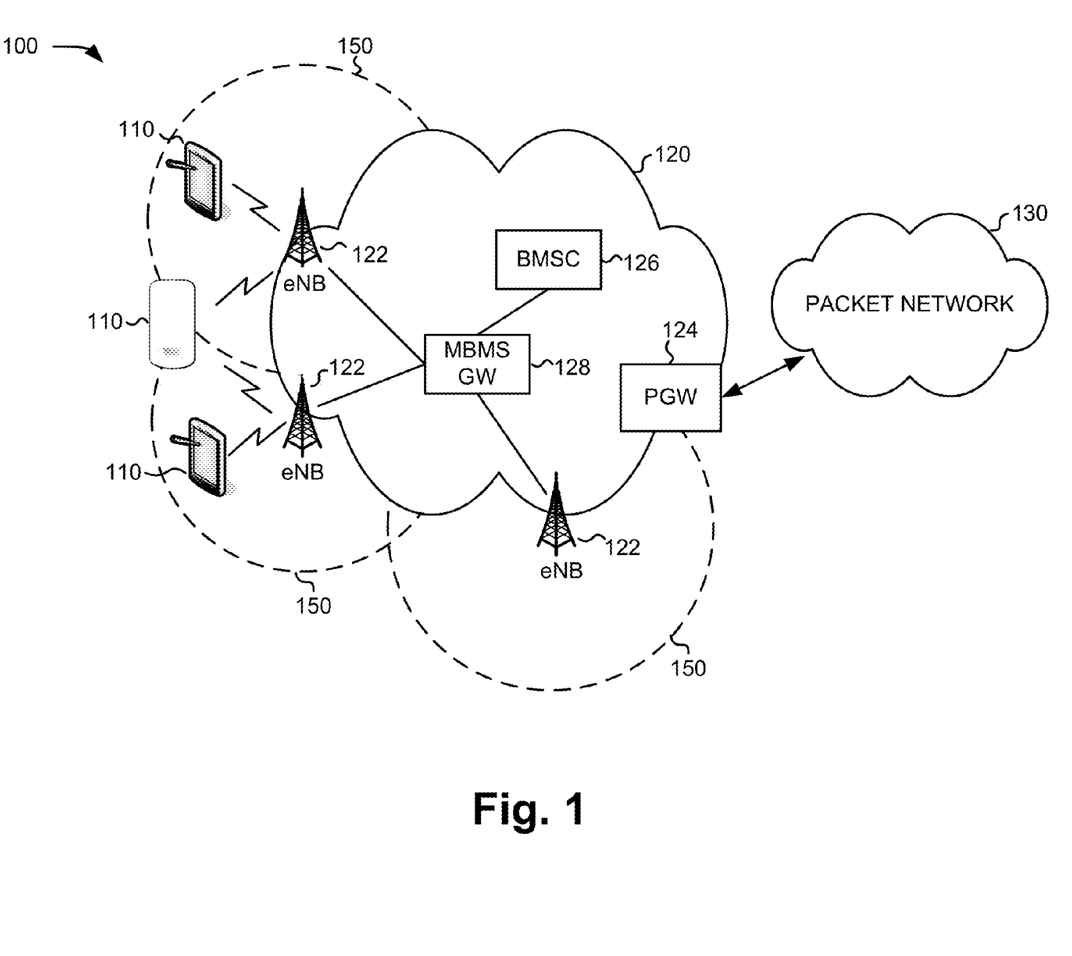
FIG. 1 is a diagram of an example environment in which systems and/or methods described herein may be implemented.

FIG. 1 is a diagram of an example environment 100 in which systems and/or methods described herein may be implemented. As illustrated, environment 100 may include mobile devices 110, a wireless network 120, and a packet network 130.

Mobile devices 110 may include portable computing and communication devices, such as a personal digital assistant (PDA), smart phone, a cellular phone, a laptop with an integrated connectivity to a cellular wireless network, etc. Mobile devices 110 may connect, through a radio link, to wireless network 120. Mobile devices 110 may obtain content from wireless network 120, such as video content, audio content, software updates, or other content. Some of the content may be content in which it may be useful to simultaneously transmit the content to a number of mobile devices 110, such as audio or video content that is broadcast at a particular time or content that may be pre-delivered and stored by a number of mobile devices 110 and then later viewed.

Wireless network 120 may include a network that provides connectivity to mobile devices 110. Wireless network 120 may represent, for example, a cellular network operated by a cellular provider. In one implementation, wireless network 120 may include a long term evolution (LTE) network that provides wireless services to mobile devices 110. Wireless network 120 may particularly include base stations ("eNBs") 122, a packet data network gateway (PGW) 124, a broadcast multicast service center (BMSC) 126, and a MBMS gateway (GW) 128. Although referred to as a "wireless" network, the wireless portion of wireless network 120 may particularly refer to the radio interface between mobile devices 110 and base stations 122. Connections between network devices (e.g., base stations 122, PGW 124, BMSC 126, and MBMS GW 128) within wireless network 120 may include wired and/or wireless connections. In general, a number of other networks devices, which are not shown herein for clarity, may also be used in the implementation of wireless network 120.

Base stations 122 may provide the radio interface to transmit and receive data with mobile devices 110. In one implementation, base stations 122 may utilize LTE standards (i.e., base stations 122 may each be a base station in a LTE network).

Each base station 122 may be associated with one or more geographical service areas surrounding the base station. The service areas may be referred to as wireless "cells" or "sectors" that are defined by the radio range of a base station 122. A single sector, corresponding to each of base stations 122, is shown as sector 150 in FIG. 1. In an alternative possible implementation, one base station 122 may be associated with multiple sectors.

With respect to multicast transmissions, in some implementations, base stations 122 may include logic to manage MBMS multicast transmissions, such as logic responsible for allocation of time and frequency resources, on the radio interface, for one or more cells. Through MBMS multicasting, content may be simultaneously transmitted to multiple mobile devices 110 on a shared radio channel.

PGW 124 may provide connectivity to external networks, such as packet network 130. PGW 124 may perform, for example, policy enforcement, packet filtering for each user, charging support, lawful interception, and/or packet screening.

BMSC 126 may include a server or other entity that acts as the functional entity in charge of providing MBMS to end-users. BMSC 126 may act as the entry point for content providers, such as content servers in packet network 130. BMSC 126 may provide authorization services for mobile devices requesting MBMS service, scheduling of broadcast and multicast sessions, and MBMS session announcement.

MBMS GW 128 may include a server or other entity that may track and collect information, such as charging information, relating to MBMS traffic. MBMS GW 128 may also distribute packets that are to be multicast broadcast to base stations 122.

Packet network 130 may include a public or private (or both) packet-based network. One or more servers may be connected to or be located within packet network 130. The servers may provide, for example, content delivery, to mobile devices 110, over wireless network 120.

In implementations described herein, content, such as video content, audio content, or other content, may be delivered to mobile devices 110 using MBMS multicast. The multicast may be optimized, such as to optimize the use of the radio access network, based on feedback from mobile devices 110.

Although FIG. 1 illustrates example components of environment 100, in other implementations, environment 100 may include additional components, fewer components, different components, or differently arranged components than those illustrated in FIG. 1 and described herein. Alternatively, or additionally, one or more components of environment 100 may perform one or more tasks described as being performed by one or more other components of the portion of environment 100. For example, the functionality implemented by BMSC 126 and MBMS GW 128 may be performed by a single physical device or multiple physical devices.

Figure 2:
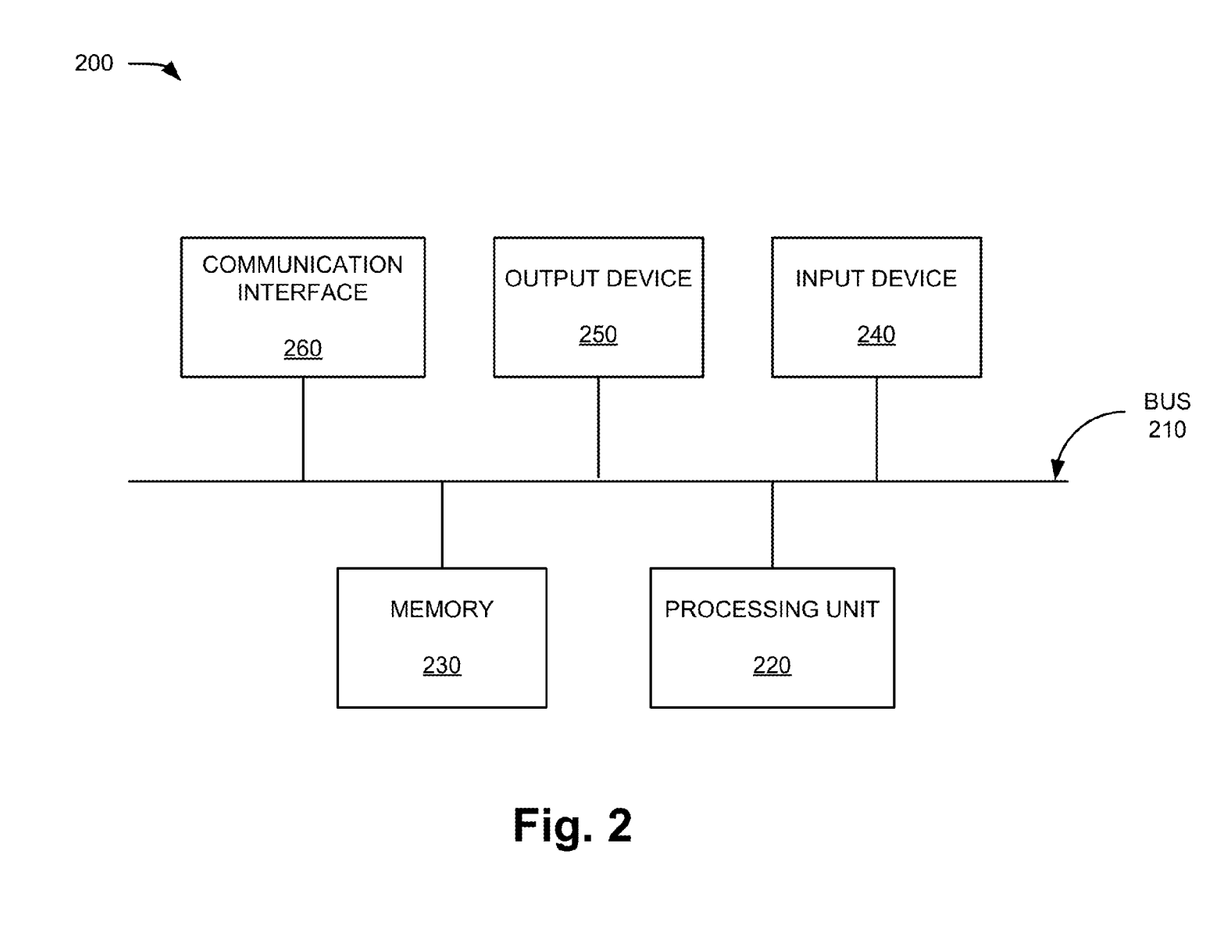
FIG. 2 is a diagram of example components of a device that may correspond to one of the components shown in the environment of FIG. 1.

FIG. 2 is a diagram of example components of a device 200 that may correspond to one of the components shown in environment 100, such as mobile device 110, base station 122, PGW 124, BMSC 126, or MBMS GW 128. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. Additionally or alternatively, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen, one or more biometric mechanisms, and the like. Output device 250 may include a device that outputs information to the operator, such as a display, a speaker, a projector etc.

Communication interface 260 may include any transceiver-like mechanism that enables device 200 to communicate with other devices and/or systems. For example, communication interface 260 may include mechanisms for communicating with other devices.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
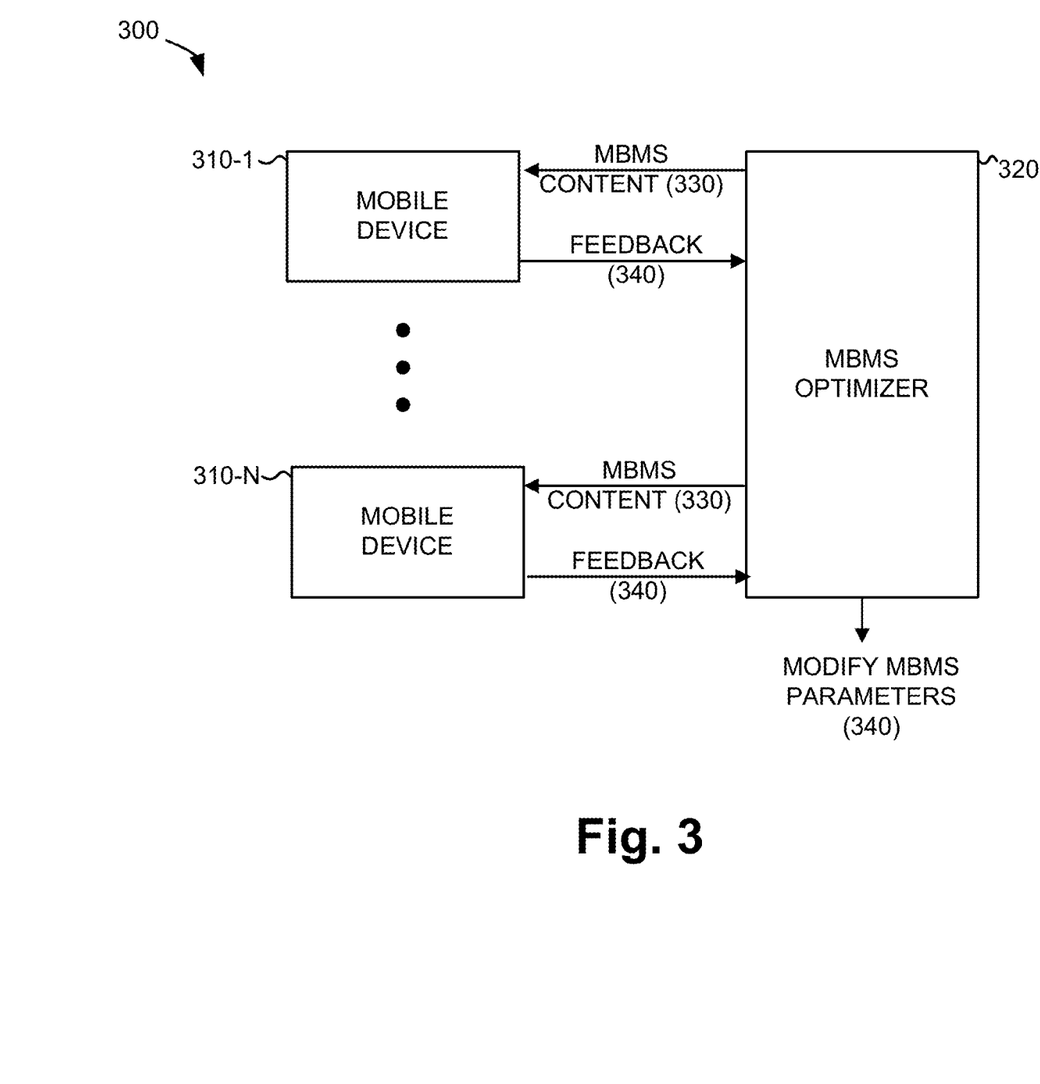
FIG. 3 is a diagram of example functional components relating to multicast resource optimization based on user feedback.

FIG. 3 is a diagram of example functional components 300 relating to multicast resource optimization based on user feedback. As shown, one or more mobile devices 310-1 through 310-N (referred to collectively as "mobile devices 310" or individually as "mobile device 310"), which may correspond to mobile devices 110 in FIG. 1, may communicate with MBMS optimizer component 320. MBMS optimizer component 320 may correspond to, for example, logic implemented in one or more of base stations 122, BMSC 126, and/or MBMS GW128.

MBMS optimizer component 320 may transmit MBMS content 330 to mobile devices 310. As previously mentioned, MBMS content may include data that is multicast, over a radio interface of a base station 122, by enabling multiple mobile devices 310 to simultaneously receive the same radio channel. By using a single radio channel to transmit to multiple mobile devices 310, radio resources can be saved relative to a unicast transmission in which each mobile device 310 may use a separate radio channel. In one implementation, packetized content, such as content received from packet network 130, may be converted to packet data units or transport blocks, encoded and modulated in the resource blocks over a series of fixed length frames or subframes, such as MBSFN (Multimedia Broadcast over a Single Frequency Network) frames, when transmitted over the radio interface. Mobile devices 310 may receive the MBSFN frames over the radio interface, demodulate, decode and reassemble the packet data units carried by the MBSFN frames to obtain the packetized content, which the mobile device 310 may convert into the original content stream.

At certain times, mobile devices 310 may provide feedback 340, to MBMS optimizer component 320, relating to the quality of the received MBMS content 330 or to the quality of the MBMS radio channel. For example, each of mobile devices 310 may monitor the frame or block error rate of the transport blocks carrying the MBMS content 330, the packet loss rate relating to MBMS content 330, received power of the radio link corresponding to MBMS content 330, estimations or measurements based on MBSFN Reference Signals (RS) within the MBSFN subframe, or other information that may be relevant to the quality of the received MBMS content 330 or the quality of an MBMS radio channel. In one implementation, feedback 340 may be provided to MBMS optimizer component 320 using the Channel Quality Information (CQI) report format. Alternatively, feedback 340 may be provided as a Received Power (RSRP) report and/or Reference Signal Received Quality (RSRQ) report. Other manners of providing feedback 340 may alternatively be used.

MBMS optimizer component 320 may aggregate feedback 340 from multiple mobile devices 310. Based on the aggregated feedback 340, MBMS optimizer component 320 may determine whether one or more parameters, relating to the transmission of MBMS content 330, should be modified. In one implementation, MBMS optimizer component 320 may modify parameters relating to the transmission of MBMS content 330 when the quantity of frame or packet errors, detected by multiple mobile devices 310, is greater than a threshold. The modified parameters may include parameters relating to the modulation order for the MBMS multicast content, parameters relating to the amount of redundant symbols included in repetition coding for the MBMS content 330, parameters relating to the number of resource blocks or subframes used for transmission of MBMS content 330, or any other parameters that may be used to adjust the operation of the MBMS transmission in a manner that improves the efficiency and quality of the transmission. As an example, assume that MBMS optimizer component 320, while performing an MBMS multicast transmission to four mobile devices 310, receives feedback 340 indicating a spike in frame reception errors by three of the four mobile devices 310. MBMS optimizer component 320 may respond by increasing the amount of redundant symbols used in repetition coding over the radio channel. In some implementations, in response to a certain period of error-free transmission, MBMS optimizer component 320 may revert previous modifications to the transmission parameters. For instance, in the previous example, after a period of error-free operation using the increased amount of redundant symbols, MBMS optimizer component 320 may change the parameters relating to the redundant symbols back to the default value(s).

In some implementations, mobile devices 310 may only transmit feedback 340 in response to errors experienced in receiving MBMS content 330. In this case, feedback 340 may correspond to error states relating to the transmission of the MBMS content.

Figure 4:
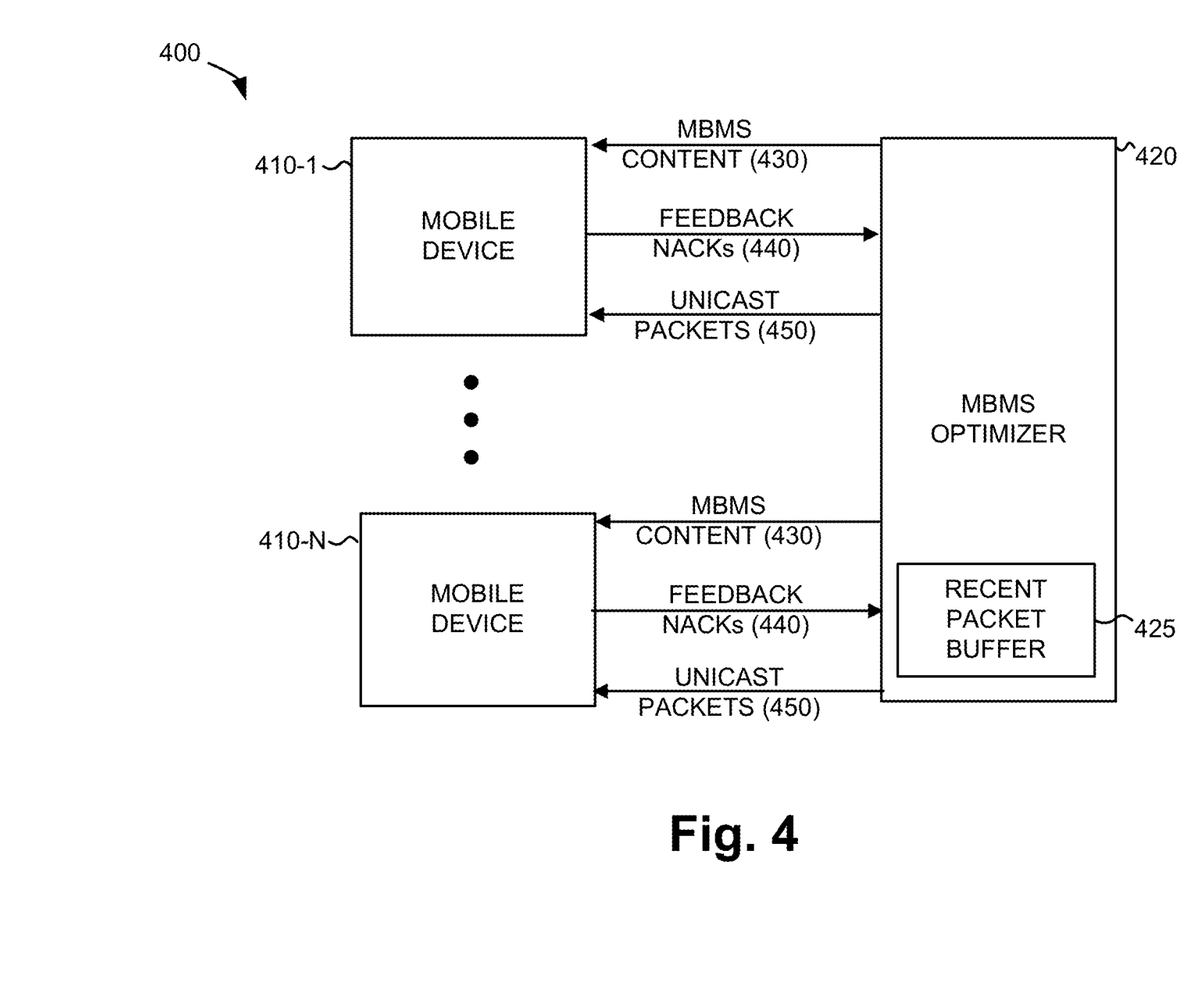
FIGS. 4 and 5 are diagrams of example functional components relating to multicast optimization, based on user feedback, according to alternative or additional possible implementations.

FIG. 4 is a diagram of example functional components 400 relating to multicast optimization, based on user feedback, according to an alternative possible implementation. As shown, mobile devices 410-1 through 410-N (referred to collectively as "mobile devices 410" or individually as "mobile device 410"), which may correspond to mobile devices 110 in FIG. 1, may communicate with MBMS optimizer component 420. MBMS optimizer component 420 may correspond to, for example, logic implemented in one or more of base stations 122, BMSC 126, or MBMS GW128.

MBMS optimizer component 420 may transmit MBMS content 430 to mobile devices 410. MBMS content 430 may be similar to MBMS content 330, as discussed with respect to FIG. 3. MBMS optimizer component 420 may store recently transmitted packets in recent packet buffer 425. Recent packet buffer 425 may include, for example, a list, a queue, or other data structure, stored in memory and that contains recently transmitted packets. In one implementation, to conserve storage space, packets may be stored in recent packet buffer 425 for a particular time period (e.g., a few seconds or minutes) and deleted at the end of the particular time period.

At certain times, mobile devices 410 may provide feedback to MBMS optimizer component 420, relating to the quality of received MBMS content 430. The feedback may include negative acknowledgments (NACKs) 440 indicating that a particular MBSFN subframe, transport block, or packet (or packets) is lost, dropped, or not otherwise correctly received. For example, each of mobile devices 410 may receive the radio frames corresponding to MBMS content 430 and may demodulate, decode the received transport block and assemble the received frames into packets. Mobile devices 410 may determine when a transport block, MBSFN subframe or packet is not correctly received, and in response, may transmit a NACK 440 identifying the particular transport block, MBSFN subframe, or packet.

MBMS optimizer component 420 may read the transport blocks, subframes or packets indicated in NACKs 440, from recent packet buffer 425, and may retransmit the packets to each mobile device 410 for which a corresponding NACK was received, as unicast packets 450. The retransmission of the packets may be performed as a unicast operation. For example, MBMS optimizer component 420 may retransmit packets in non-MBSFN frames or subframes that may be transmitted in between MBSFN frames. Re-transmitting packets in a unicast manner may be more robust, in some situations, by exploiting radio network gains based on transmit diversity, beamforming transmission modes, or frequency selective scheduling.

Some mobile devices 410 may be capable of simultaneously receiving multicast MBMS content and unicast content. In this case, the mobile device 410 may need to determine whether unicast packets received in a non-MBSFN subframe include fresh unicast data (such as content that may be sent entirely via unicast) or a retransmitted unicast packet 450. One technique for distinguishing between fresh unicast packets or retransmitted unicast packets 450 may involve encoding the packet dedicated control channel (PDCCH) with a radio network temporary identifier (RNTI) that is designated for the MBMS multicast channel (i.e., the MBMS-RNTI). Mobile devices 410 may search and decode the PDCCH to determine whether a particular unicast packet is a fresh unicast packet or a retransmitted unicast packet 450. In this case, multiple mobile devices 410, in the same cell site, that experienced lost MBMS packets, may decode the same PDCCH with the same MBMS-RNTI to obtain the retransmitted unicast packets 450. In other words, multiple mobile devices may decode a unicast control channel, using a shared identifier, to determine the transmission format and resource location in the unicast subframe at which the MBSFN data is re-transmitted. Thus, the same unicast radio channel resource can be shared by multiple mobile devices 410 to receive the retransmitted multicast packet 450.

Alternatively, the determination of whether a received unicast packet represents a fresh packet or a retransmitted unicast packet 450 may be performed using other techniques. For example, mobile devices 410 may distinguish fresh unicast packets from retransmitted unicast packets 450 based on the source Internet Protocol (IP) addresses of the packets.

Figure 5:
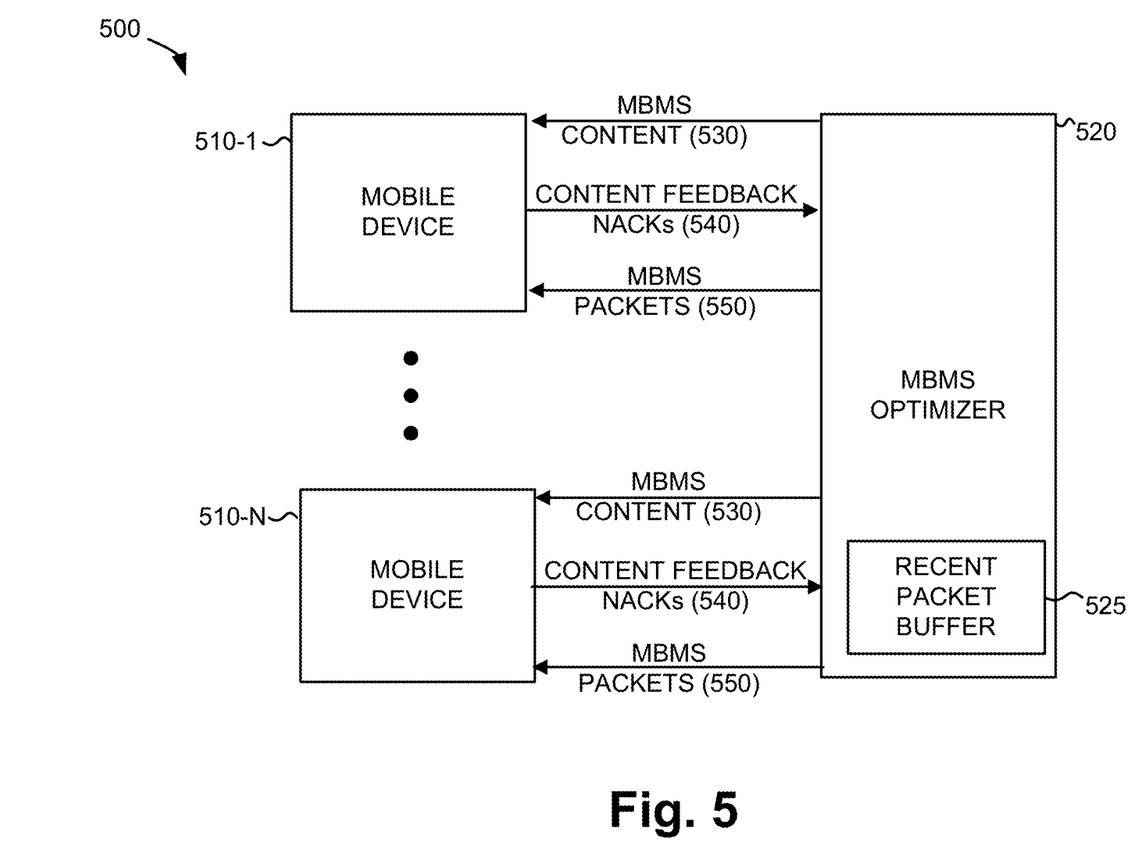

FIG. 5 is a diagram of example functional components 500 relating to multicast optimization, based on user feedback, according to an alternative possible implementation. As shown, mobile devices 510-1 through 510-N (referred to collectively as "mobile devices 510" or individually as "mobile device 510"), which may correspond to mobile devices 110 in FIG. 1, may communicate with MBMS optimizer component 520. MBMS optimizer component 520 may correspond to, for example, logic implemented in one or more of base stations 122, BMSC 126, or MBMS GW128.

MBMS optimizer component 520 may transmit MBMS content 530 to mobile devices 510. MBMS content 530 may be similar to MBMS content 330 or MBMS content 430, as discussed with respect to FIGS. 3 and 4. MBMS optimizer component 520 may store recently transmitted packets in a recent packet buffer 525. Recent packet buffer 525 may include, for example, a list, a queue, or other data structure that stores the recently transmitted packets. In one implementation, to conserve memory space, packets may be stored in recent packet buffer 525 for a particular time period (e.g., a few seconds or minutes) and deleted at the end of the particular time period.

At certain times, mobile devices 510 may provide feedback to MBMS optimizer component 520, relating to the quality of the received MBMS content 530. The feedback may include negative acknowledgments (NACKs) 540 indicating that a particular transport block, MBSFN subframe or packet (or packets) is lost or not otherwise correctly received. For example, each of mobile devices 510 may receive the radio frames corresponding to MBMS content 530 and may assemble the received frames into packets. Mobile devices 510 may determine when a transport block, MBSFN subframe or packet is not correctly received, and in response, may transmit a NACK 540 identifying the particular transport block, MBSFN subframe or packet.

MBMS optimizer component 520 may analyze NACKs 540 from multiple mobile devices 510 and may determine, based on a particular packet being lost by more than one mobile device 510, to retransmit lost packets through MBMS as a multicast transmission (MBMS packets 550). For example, in one implementation, MBMS optimizer component 520 may determine to retransmit through MBMS multicast, any packets, of MBMS content 530, that were reported as lost by at least a threshold quantity of mobile devices 510 (e.g., lost by at least two mobile devices 510).

In one implementation, MBMS optimizer component 520 may reserve MBMS capacity for retransmission. For example, MBMS optimizer component 520 may reserve a certain quantity or a certain portion of the MBSFN subframes for retransmission of lost packets. In some implementations, MBMS optimizer component 520 may use the radio resource control (RRC) protocol to dynamically modify the quantity of frames or subframes that are used for retransmission of lost packets. The modification may be based on the latest MBMS block, frame or packet error rate, as determined based on NACKs 540 from mobile devices 510.

Although FIGS. 3-5 show example functional components relating to multicast optimization, in other implementations, the functional components may contain fewer functional components, different functional components, differently arranged functional components, or additional functional components than depicted in FIGS. 3-5. Alternatively, or additionally, one or more of the described functional components may perform one or more tasks described as being performed by one or more other functional components.

Figure 6:
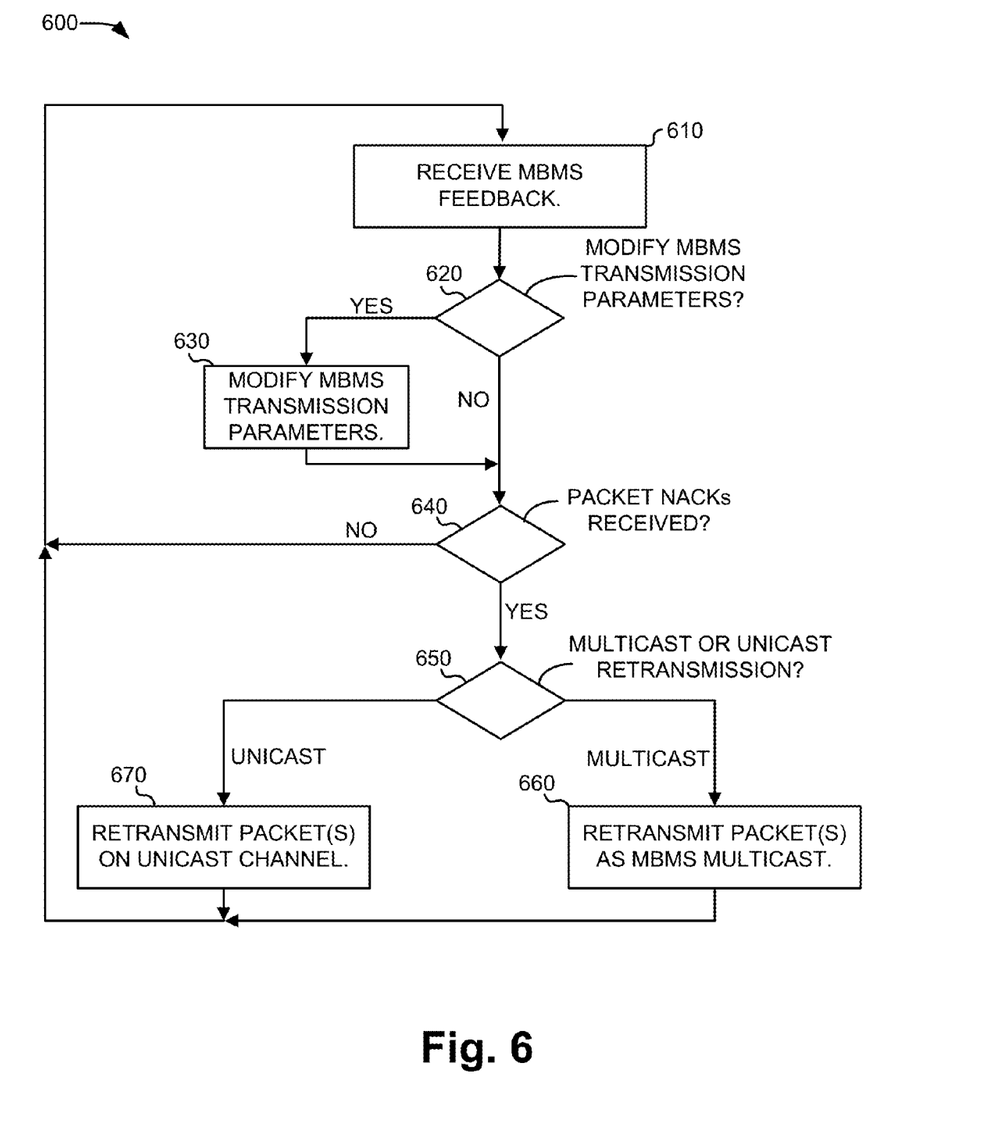
FIG. 6 is a flow chart illustrating an example process for performing multicast optimization.

FIG. 6 is a flow chart illustrating an example process 600 for performing multicast optimization. The process of FIG. 6 may represent a process that combines the concepts discussed with respect to FIGS. 3-5. Process 600 may be performed by, for example, one or more base stations 122, BMSC 126, MBMS GW 128, or by other components in environment 100.

Process 600 may include receiving feedback from mobile devices 110 (block 610). The feedback may include, as discussed with respect to FIGS. 3-5, information relating to an amount or rate of dropped or lost transport blocks, frames or packets (e.g., packet NACKs), information relating to the signal quality of an MBMS multicast channel, or other information relating to the quality of an MBMS multicast transmission being received by one or more mobile devices 110. In one implementation, the type of feedback that is particularly received from a mobile device 110 may be determined by a network device. For instance, base stations 122 may transmit configuration information to mobile devices 110, where the configuration information sets the type of feedback that is to be received from mobile devices 110.

Process 600 may further include determining whether to modify MBMS transmission parameters (block 620). The decision whether to modify the MBMS transmission parameters may be based on aggregate feedback from multiple mobile devices 110. In one implementation, a decision to modify the MBMS transmission parameters may be made when the quantity of frame or packet errors, detected by multiple mobile devices 110, is greater than a threshold. In general, the decision to modify the MBMS transmission parameters may be made when a modified version of the transmission parameters is determined to likely to be more effective in implementing MBMS multicast transmission than the current version of the transmission parameters.

Process 600 may further include, when it is determined to modify the MBMS transmission parameters (block 620—YES), performing the modification of the MBMS transmission parameters (block 630). As previously discussed with reference to FIG. 3, the modified parameters may include, for example, parameters relating to the modulation order for the MBMS multicast content, parameters relating to the amount of redundant symbols included in repetition coding for the MBMS content, or parameters relating to the number of resource blocks used for transmission of MBMS content. The modified version of the parameters may be subsequently used by, for example, base stations 122, in implementing MBMS multicast transmissions.

Process 600 may further include determining whether any negative acknowledgments (NACKs) were received from mobile devices 110 (block 640). A NACK may indicate that one or more packets were lost or not correctly received by a mobile device 110. When no NACKs are received (block 640—NO), packets may not need to be retransmitted to mobile devices 110.

Process 600 may further include, when at least one NACK for a packet is received (block 640—YES), determining whether to retransmit the packet as a multicast or unicast retransmission (block 650). Whether to retransmit the packet as a multicast or unicast retransmission may generally be based on a determination of which technique is more efficient, such as which technique leads to more efficient use of the radio interface. In one implementation, MBMS multicast retransmission may be used for a packet in which at least two mobile devices 110 have not correctly receive a packet. Otherwise, unicast retransmission may be used. In alternative implementations, other techniques may be used to determine whether to use multicast or unicast retransmission. For example, all lost packets may be retransmitted through multicast or all lost packets may be retransmitted through unicast.

Process 600 may further include, when it is determined to use multicast transmission, (block 650—MULTICAST), transmitting the lost packets through MBMS multicast transmission (block 660). Using MBMS multicast transmission to retransmit lost packets was previously discussed with reference to FIG. 5.

Process 600 may further include, when it is determined to use unicast transmission, (block 650—UNICAST), transmitting the lost packets through a unicast channel (block 670). Using unicast to retransmit lost packets was previously discussed with reference to FIG. 4.

As discussed above, multicast transmission of content over a radio interface may be optimized based on feedback from mobile devices 110. A more detailed discussion of potential feedback mechanisms will next be discussed.

Mobile devices 110 may, at different times, be in varying activity states. The differing activity states may correspond to different energy consumption levels by the mobile device. One activity state, the RRC_idle state, may correspond to a state in which mobile device 110 is able to receive MBMS multicast traffic, but not transmit traffic. Another activity state, the RRC_connected state, may correspond to a full power state in which mobile device 110 is able to both transmit and receive data.

One possible implementation for transmitting packet NACKs, from mobile devices 110, may include entering the RRC_connected state whenever a NACK is to be sent. For example, mobile device 110, if receiving MBMS multicast traffic in the RRC_idle state, may enter the RRC_connected state when a NACK is to be sent.

In an alternative possible implementation for transmitting NACKs, mobile device 110 may minimize time in the RRC_connected state by waiting for a particular quantity of lost packets or waiting a particular time period before transitioning from the RRC_idle state to the RRC_connected state. This may be possible since the NACKs are not necessarily real-time. In one implementation, the particular quantity of lost packets or the particular time period may be based on the type of content being multicast. For example, streaming audio or video that is being immediately viewed by a user of mobile device 110 may require relatively low thresholds for the particular quantity of lost packets or for the particular time period. In contrast, content being downloaded in the background for later playback by the user, may be able to tolerate higher thresholds for the particular quantity of lost packets or the particular time period. In one implementation, the threshold for the particular quantity of lost packets or the particular time period may also be set based on one or more factors, such as network congestion.

One technique for determining a particular quantity of lost packets before a mobile device 110 transmits a NACK may include counting the number of error or lost MBMS transport blocks, subframes or packets, Ne, over an interval of M radio frames. An error ratio, L, may then be computed as Ne/Nt, where Nt may be the total number of MBMS packets received over the M radio frames. The error ratio, L, may then be compared to a threshold value. Mobile device 110 may send a NACK when L is greater than the threshold value. For this technique, parameters such as M and L may be configurable.

In some implementations, feedback may be provided by mobile devices 110 in unicast subframes immediately following MBSFN subframes, such as through PUCCH or PUSCH transmissions. For this feedback, base stations 122 may determine the MBSFN subframes in which the corresponding error conditions occurred based on the timing (e.g., the subframe number) of when the feedback is received. However, if mobile device 110 needs to first transition from the RRC idle to RRC_connected state, mobile device 110 may not be able to send feedback in the unicast subframe immediately following the MBSFN subframe. This may be resolved by mobile device 110 staying in the RRC_connected state until the next MBSFN transmission for the same MBMS channel and then sending, if the error condition remains, feedback in the subsequent unicast subframe. At this point, mobile device 110 may again enter the RRC_idle state to avoid overloading network 120. In some situations, such as when there are multiple MBMS channels that transmit in consecutive MBSFN subframes before a unicast subframe, a particular base station 122 may not be able to identify the specific MBMS channel corresponding to the error information in the feedback from mobile device 110. In this case, to enable the particular base station 122 to identify the specific MBMS channel, an MBMS measurement report may be sent, by mobile device 110, that includes information, such as information identifying a cell of wireless network 110, the broadcast channel, an estimate of the channel quality, and the error conditions experienced by mobile device 110, and any other relevant channel information.

Figure 7:
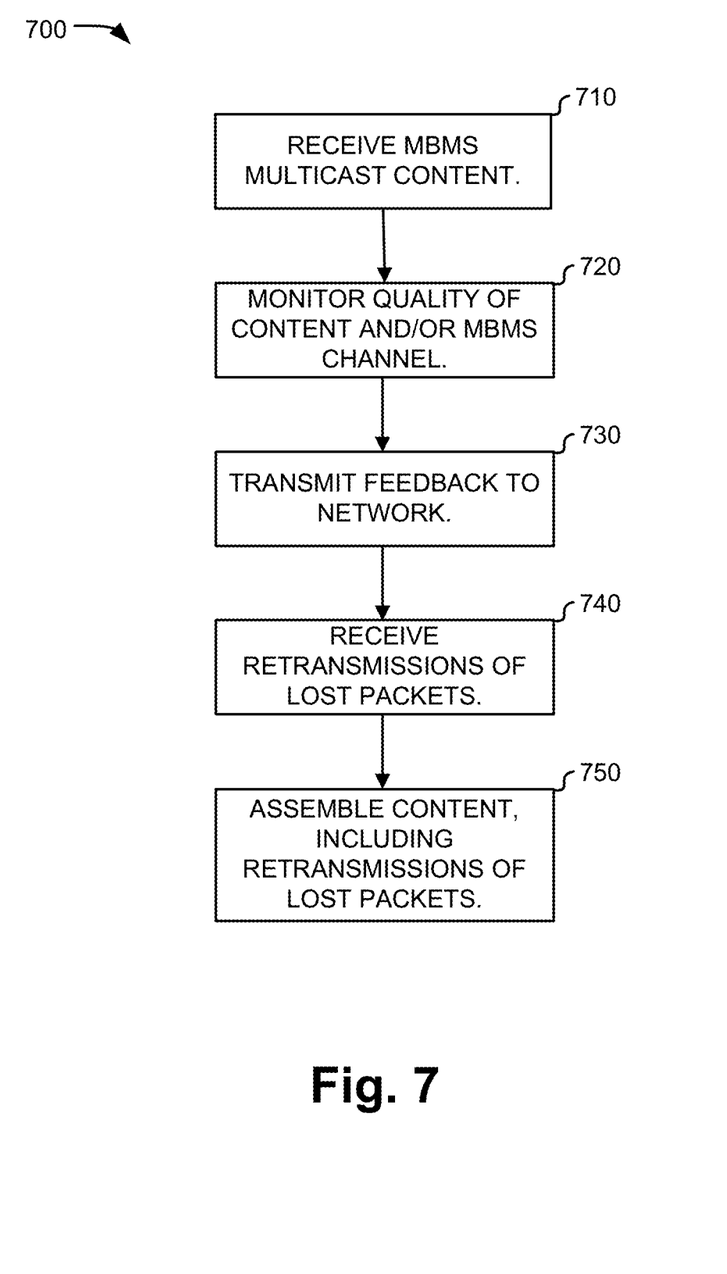
FIG. 7 is a flow chart illustrating an example process for receiving multicast content.

FIG. 7 is a flow chart illustrating an example process 700 for receiving multicast content. Process 700 may be performed by a mobile device 110.

Process 700 may include receiving MBMS multicast content (block 710). As previously mentioned, the multicast content may be received as a series of MBSFN frames on a radio channel that may potentially be shared by multiple mobile devices 110.

Process 700 may further include monitoring the quality of the received content and/or the quality of the radio channel (block 720). Mobile device 110 may, for example, demodulate, decode and assemble the received multicast frames into packets and may determine when one or more transport blocks, subframes or packets were lost in the transmission. Alternatively or additionally, mobile device 110 may monitor characteristics of the received radio channel, such as lower-level error statistics relating to the received radio channel or the signal to interference power level of the received radio channel.

Process 700 may further include transmitting feedback to a network (block 730). For example, mobile device 110 may transmit feedback to base station 122 of network 120. The feedback may include NACKs that identify packets that were lost during transmission. In one implementation, the feedback may be transmitted at particular times, such as when the above-discussed error ratio, determined based on a count of the number of lost transport blocks, frames or packets relative to a total number of received transport blocks, frames or packets, is greater than a threshold value. In other implementations, the feedback may include information, other than NACKs, relating to the quality of the radio channel. In one implementation, and as discussed above, a mobile device 110 that is in a low power state, such as an RRC_idle state, when it is determined to transmit feedback to network 120, may transition to a higher power state, such as an RRC_connected state, in order to perform the transmission. Mobile device 110 may then resume the RRC_idle state after the feedback has been transmitted.

Process 700 may further include receiving retransmissions of lost packets (block 740). As discussed above, the retransmission of lost packets may be received as unicast transmissions or as an MBMS multicast transmission. For example, base stations 122 may reserve MBSFN subframes in which lost packets may be transmitted to mobile devices 110.

Process 700 may further include demodulating, decoding and assembling the transmitted content (block 750). The content may include the retransmitted packets, as received by mobile device 110, that are reinserted into the content stream.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more devices, the method comprising:
    transmitting, by the one or more devices, content to a plurality of mobile devices as a Multimedia Broadcast Multicast Services (MBMS) multicast transmission in which the plurality of mobile devices share a single radio channel to receive the content;
    receiving, by the one or more devices, feedback, from the plurality of mobile devices, about the MBMS multicast transmission, where the feedback relates to a quality of the content, as received by the plurality of mobile devices, or to a quality of the radio channel;
    determining, by the one or more devices and based on the received feedback, whether to modify transmission parameters relating to the MBMS multicast transmission;
    modifying, by the one or more devices, the transmission parameters, to obtain a modified version of the transmission parameters, relating to the MBMS multicast transmission, when the determination of whether to modify the transmission parameters indicates that the modified version of the transmission parameters is likely to be more effective to implement the MBMS multicast transmission than a current version of the transmission parameters;
    determining, by the one or more devices, whether the feedback indicates that two or more mobile devices, of the plurality of mobile devices, lost data, corresponding to the content, during the MBMS multicast transmission;
    determining, by the one or more devices and when the two or more of the mobile devices have been determined to have lost data during the MBMS multicast transmission, to retransmit the lost data to the two or more mobile devices as a unicast transmission; and
    retransmitting, by the one or more devices, the lost data as the unicast transmission, in response to the determination to retransmit the lost data as the unicast transmission, wherein the retransmission of the lost data as the unicast transmission includes:
        retransmitting, to the two or more mobile devices, the lost data via a unicast channel in which a corresponding unicast control channel is decodable by the two or more mobile devices using a shared radio network temporary identifier (RNTI) that is designated for a channel corresponding to the multicast transmission, the two or more mobile devices decoding the unicast control channel to determine whether a particular unicast packet, in the unicast channel, is a retransmitted packet that corresponds to lost data or a non-retransmitted packet.

2. The method of claim 1, where the lost data includes lost packets, lost Multimedia Broadcast over a Single Frequency Network (MBSFN) transport blocks, or lost MBSFN subframes.

3. The method of claim 1, where the feedback includes at least one of negative acknowledgments (NACKs) indicating that one or more packets have been dropped, an indication of errors associated with the radio channel received by a particular one of the plurality of mobile devices, or an indication of signal quality associated with the MBMS radio channel.

4. The method of claim 3, further comprising:
    configuring the plurality of mobile devices to set the type of feedback received from the plurality of mobile devices.

5. The method of claim 1, where the modified version of the transmission parameters include parameters relating to a modulation order for the MBMS multicast transmission, parameters relating to an amount of redundant symbols included in the coding for the content, or parameters relating to a quantity of resource blocks and subframes used for transmission of the content.

6. The method of claim 1, where the retransmission of the lost data as the unicast transmission includes retransmitting the lost data in non-Multimedia Broadcast over a non-Single Frequency Network subframes.

7. The method of claim 1, where the feedback is received in response to transmission, by the plurality mobile devices, of the feedback, whenever an error rate of the data blocks, frames or packet content, as received by the plurality of mobile devices, is greater than a threshold.

8. The method of claim 1, where the feedback is received as a Multimedia Broadcast over a Single Frequency Network (MBSFN) Channel Quality Information (CQI) report, a Received Power (RSRP) report, or a Reference Signal Received Quality (RSRQ) report.

9. One or more devices comprising:
one or more processors; and
one or more memories, coupled to the one or more processors, the one or more memories storing instructions, that when executed by the one or more processors, cause the one or more processors to:
transmit content to a plurality of mobile devices as a Multimedia Broadcast Multicast Services (MBMS) multicast transmission in which the plurality of mobile devices share a single radio channel to receive the content;
receive feedback, from the plurality of mobile devices, about the MBMS multicast transmission, where the feedback relates to a quality of the content, as received by the plurality of mobile devices, or to a quality of the radio channel;
determine, based on the received feedback, whether to modify transmission parameters relating to the MBMS multicast transmission;
modify the transmission parameters, to obtain a modified version of the transmission parameters, relating to the MBMS multicast transmission, when the determination of whether to modify the transmission parameters indicates that the modified version of the transmission parameters is likely to be more effective to implement the MBMS multicast transmission than a current version of the transmission parameters;
determine whether the feedback indicates that two or more mobile devices, of the plurality of mobile devices, lost data, corresponding to the content, during the MBMS multicast transmission;
determine, when the two or more of the mobile devices have been determined to have lost data during the MBMS multicast transmission, to retransmit the lost data to the two or more mobile devices as a unicast transmission; and
retransmit the lost data as the unicast transmission, in response to the determination to retransmit the lost data as the unicast transmission, wherein the retransmission of the lost data as the unicast transmission includes retransmitting, to the two or more mobile devices, the lost data via a unicast channel in which a corresponding unicast control channel is decodable by the two or more of the mobile devices using a shared radio network temporary identifier (RNTI) that is designated for a channel corresponding to the multicast transmission, the two or more mobile devices decoding the unicast control channel to determine whether a particular unicast packet, in the unicast channel, is a retransmitted packet that corresponds to lost data or a non-retransmitted packet.

10. The one or more devices of claim 9, where the lost data includes lost packets, lost Multimedia Broadcast over a Single Frequency Network (MBSFN) transport blocks, or lost MBSFN subframes.

11. The one or more devices of claim 9, where the feedback includes at least one of negative acknowledgments (NACKs) indicating that one or more packets have been dropped, an indication of errors associated with the radio channel received by a particular one of the plurality of mobile devices, or an indication of signal quality associated with the MBMS radio channel.

12. The one or more devices of claim 9, where the modified version of the transmission parameters include parameters relating to a modulation order for the MBMS multicast transmission, parameters relating to an amount of redundant symbols included in the coding for the content, or parameters relating to a quantity of resource blocks used for transmission of the content.

13. A method implemented by a mobile device, the method comprising:
receiving, by the mobile device, content that is transmitted on a radio channel that is shared with one or more other mobile devices as a multicast transmission;
monitoring, by the mobile device, a quality of the content received on the radio channel;
determining, by the mobile device, whether to transmit feedback relating to the quality of the content received on the radio channel, where the determination is based on an error threshold determined for the content, and where the feedback includes negative acknowledgments (NACKs) indicating a portion of the content that was lost in transmission;
transitioning, by the mobile device, from a low power state to a higher power state, when the determination is made to transmit feedback and when the device is in the low power state;
transmitting, by the mobile device, the feedback relating to the quality of the content;
transitioning, by the mobile device, from the higher power state back to the low power state in response to the transmission of the feedback;
receiving, by the mobile device and via a unicast transmission in which a corresponding unicast control channel is decodable by multiple mobile devices using a shared radio network temporary identifier (RNTI) that is designated for a channel corresponding to the multicast transmission, the portion of the content that was lost; and
decoding, by the mobile device, the unicast control channel to determine whether a particular unicast packet, in the unicast transmission, is a retransmitted packet that corresponds to lost data or a non-retransmitted packet.

14. The method of claim 13, where the low power state includes a radio resource control (RRC) idle state and the high power state includes a RRC connected state.

15. The method of claim 13, where determining whether to transmit the feedback includes:
calculating the error threshold based on a count of the number of lost Multimedia Broadcast over a Single Frequency Network (MBSFN) transport blocks, frames or packets relative to a total number of received packets, or within a specific duration or number of radio frames.

16. The method of claim 13, where the content is received as Multimedia Broadcast over a Single Frequency Network (MBSFN) frames or as multimedia multicast over network frames.

17. The method of claim 13, where the receiving the portion of the content that was lost includes:
receiving the portion of the content that was lost as the unicast transmission in which the portion of the content that was lost is transmitted in non-Multimedia Broadcast over a non-Single Frequency Network (MBSFN) frames.

18. A mobile device comprising:
one or more processors; and
one or more memories, coupled to the one or more processors, the one or more memories storing instructions, that when executed by the one or more processors, cause the one or more processors to:

receive content that is transmitted on a radio channel that is shared with one or more other mobile devices as a multicast transmission;

monitor a quality of the content received on the radio channel;

determine whether to transmit feedback relating to the quality of the content received on the radio channel, where the determination is based on an error threshold determined for the content, and where the feedback includes negative acknowledgments (NACKs) indicating a portion of the content that was lost in transmission;

transition from a low power state to a higher power state, when the determination is made to transmit feedback and when the device is in the low power state;

transmit the feedback relating to the quality of the content;

transition from the higher power state back to the low power state in response to the transmission of the feedback;

receive, over the radio channel, the portion of the content that was lost via a unicast transmission in which a corresponding unicast control channel is decodable by multiple mobile devices using a shared radio network temporary identifier (RNTI) that is designated for a channel corresponding to the multicast transmission; and decode the unicast control channel to determine whether a particular unicast packet, in the unicast transmission, is a retransmitted packet that corresponds to lost data or a non-retransmitted packet.

19. The device of claim 18, where the content is received as Multimedia Broadcast over a Single Frequency Network (MBSFN) frames.

* * * * *